(12) United States Patent
Hunt et al.

(10) Patent No.: US 12,188,550 B1
(45) Date of Patent: Jan. 7, 2025

(54) DIFFERENTIAL WITH IMPROVED LUBRICATION

(71) Applicant: Schaeffler Technologies AG & Co. KG, Herzogenaurach (DE)

(72) Inventors: Kenneth Hunt, Orrville, OH (US); David Battle, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/429,561

(22) Filed: Feb. 1, 2024

(51) Int. Cl.
*F16H 57/04* (2010.01)

(52) U.S. Cl.
CPC ..... *F16H 57/0428* (2013.01); *F16H 57/0483* (2013.01)

(58) Field of Classification Search
CPC ............. F16H 57/0428; F16H 57/0483; F16H 57/0431
See application file for complete search history.

(56) References Cited

U.S. PATENT DOCUMENTS

| | | | | |
|---|---|---|---|---|
| 5,885,181 A * | 3/1999 | Dissett | ................. | F16H 48/285 475/160 |
| 9,651,137 B2 * | 5/2017 | Yoshizawa | .......... | F16H 57/0457 |
| 10,527,153 B2 * | 1/2020 | Okumoto | ............ | F16H 57/0483 |
| 10,895,319 B2 * | 1/2021 | Rey | ......................... | F16H 55/22 |
| 2015/0114757 A1 * | 4/2015 | Yoshizawa | .......... | F16H 57/0457 184/6.12 |
| 2024/0068555 A1 * | 2/2024 | Naik | ................... | F16H 57/0471 |

* cited by examiner

*Primary Examiner* — Jacob S. Scott
*Assistant Examiner* — Farhana Pervin
(74) *Attorney, Agent, or Firm* — Volpe Koenig

(57) ABSTRACT

A gear assembly having a rotatable housing with an axial end face and a lubrication in-flow opening and a gear set located therein. A lubricant collection ring having an axially extending outer wall is connected to the axial end face. A radially inwardly extending sidewall extends from the axially extending outer wall in a position spaced apart from the axial end face. A lubricant deflector ring is connected to the rotatable housing radially inwardly from the lubricant collection ring. The lubricant deflector ring has a plurality of radially outwardly directed vanes that overlap with the lubricant collection ring. The vanes are configured to fling lubricant against the radially outwardly located lubricant collection ring which directs the lubricant to the at least one lubrication in-flow opening to provide lubricant to the at least one lubricant in-flow opening in the rotatable housing in order to lubricate the gear set located therein.

18 Claims, 5 Drawing Sheets

DIFFERENTIAL WITH IMPROVED LUBRICATION

TECHNICAL FIELD

The disclosure relates to lubrication of gearboxes and/or differentials having a limited oil supply.

BACKGROUND

Most known differentials run with the gears partially submerged in oil for lubrication.

In some recent applications used with E-axles, the differential shares the same lubrication as the gearbox. This provides a more limited oil supply to the differential, and relies on splashing from a gear or splash vanes moving through the oil supply for lubrication. However, some of the known arrangements do not provide sufficient lubrication within the differential gear assembly depending on driving conditions and/or other factors.

It would be desirable to provide an arrangement to ensure an increased oil flow for lubricating gearboxes or differentials without the need for complex pumps or other mechanisms.

SUMMARY

In one aspect, a gear assembly is provided that includes a rotatable housing having an axial end face with at least one lubrication in-flow opening and a gear set located in the rotatable housing. In one embodiment the gear set is comprised of helical differential gearing. However, other gearing could be utilized. A lubricant collection ring having an axially extending outer wall is connected to the axial end face. In one embodiment, the axially extending outer wall is radially outwardly from the at least one lubrication in-flow opening. A radially inwardly extending sidewall extends from the axially extending outer wall in a position spaced apart from the axial end face. A lubricant deflector ring is connected to the rotatable housing or cover and located radially inwardly from the lubricant collection ring. The lubricant deflector ring including a plurality of radially outwardly directed vanes that at least partially axially overlap with the lubricant collection ring. With this arrangement, the vanes of the lubricant deflector ring are configured to fling lubricant against the radially outwardly located lubricant collection ring which directs the lubricant to the at least one lubrication in-flow opening in order to provide an enhanced flow of lubricant to the at least one lubricant in-flow opening in the rotatable housing in order to lubricate the gear set located therein.

In one embodiment, the lubricant deflector ring includes an axially extending wall and a radially outwardly extending end wall, and the radially outwardly directed vanes are connected to the axially extending wall and the radially outwardly extending wall. The vanes may optionally include a concave-shaped free edge at an area opposite to a connection to the axially extending wall and the radially outwardly extending wall.

In one embodiment, the vanes are arranged at an angle greater than 0° and less than 35° from a true radial direction. The vanes may be angled in a direction that the rotatable housing is adapted to rotate during a majority of operating conditions, i.e., during forward vehicle movement when the gear assembly is part of a vehicle drivetrain.

In one embodiment, a sleeve-shaped support extends from the axial end face of the rotatable housing, and the lubricant deflector ring is press-fit on the sleeve-shaped support. The sleeve-shaped support can be used as a bearing support/mount for the rotatable housing.

In one embodiment, the gear assembly is a helical differential. However, it can be another type of differential or other rotating gear assembly. For the differential application, the gear assembly have the rotatable housing including a drive flange, and a gear compartment in which gears are located within the rotatable housing. Further, the axial end face can be located on a removable cover plate that is attached to an end of the rotatable housing.

In another aspect, a method of lubricating a differential is provided. The method includes:
a) providing a gear assembly in a differential casing, the gear assembly including a rotatable housing having an axial end face with at least one lubrication in-flow opening, a gear set located in the rotatable housing, a lubricant collection ring having an axially extending outer wall connected to the axial end face, and a radially inwardly extending sidewall that extends from the axially extending outer wall in a position spaced apart from the axial end face, and a lubricant deflector ring connected to the rotatable housing and located radially inwardly from the lubricant collection ring, the lubricant deflector ring including a plurality of radially outwardly directed vanes that at least partially axially overlap with the lubricant collection ring;
b) rotating the gear assembly and splashing lubricant from a bottom of the casing to the lubricant deflector ring;
c) the vanes of the lubricant deflector ring accelerating the lubricant radially outwardly; and
d) capturing at least some of the lubricant the axially extending outer wall and the radially inwardly extending sidewall, and guiding the lubricant to the at least one lubrication in-flow opening and into the rotatable housing to lubricate the gear set therein.

In one aspect, the lubricant deflector ring includes an axially extending wall and a radially outwardly extending end wall, and the radially outwardly directed vanes are connected to the axially extending wall and the radially outwardly extending wall.

In another aspect the vanes include a concave-shaped free edge at an area opposite to a connection to the axially extending wall and the radially outwardly extending wall.

In one embodiment, the method further comprises arranging the vanes at an angle greater than 0° and less than 35° from a true radial direction. The vanes may be angled in a direction that the rotatable housing is adapted to rotate during a majority of operating conditions.

In another aspect, a sleeve-shaped support extends from the axial end face, and the method further comprises press-fitting the lubricant deflector ring on the sleeve-shaped support.

In one embodiment, the axially extending outer wall is located radially outwardly from the at least one lubrication in-flow opening In one embodiment, the gear assembly is a helical differential. However, this would also apply to other types of differentials that allow a speed differential between two output shafts.

In one embodiment, the rotatable housing includes a drive flange, and a gear compartment in which gears are located, and the axial end face is located on a removable cover plate that is attached to an end of the rotatable housing.

One or more of the above features can be combined to provide a gear assembly with improved performance.

BRIEF DESCRIPTION OF THE DRAWING(S)

The foregoing Summary as well as the following Detailed Description will be best understood when read in conjunction with the appended drawings, which illustrate an embodiment according to the disclosure. In the drawings.

DETAILED DESCRIPTION

Certain terminology is used in the following description for convenience only and is not limiting. "Axial" refers to a direction along an axis. A reference to a list of items that are cited as "at least one of a, b, or c" (where a, b, and c represent the items being listed) means any single one of the items a, b, or c, or combinations thereof. The terms "generally", "about" and "approximately" are to be construed as within 10% of a stated value or ratio. "Gear Assembly" refers to a differential or other gear assembly. The terminology includes the words specifically noted above, derivatives thereof, and words of similar import.

Figure 1:
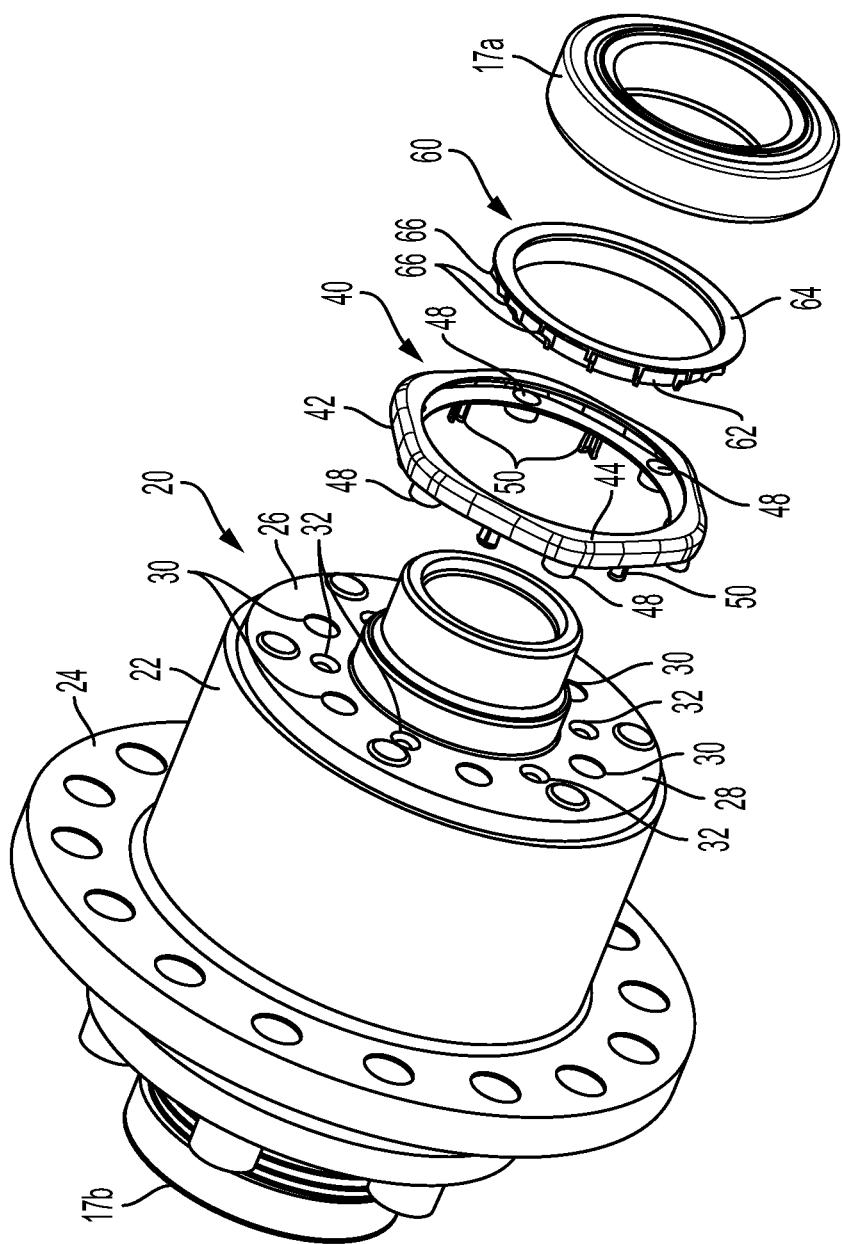
FIG. 1 is an exploded perspective view of a gear assembly according to an embodiment of the present disclosure.
Figure 2:
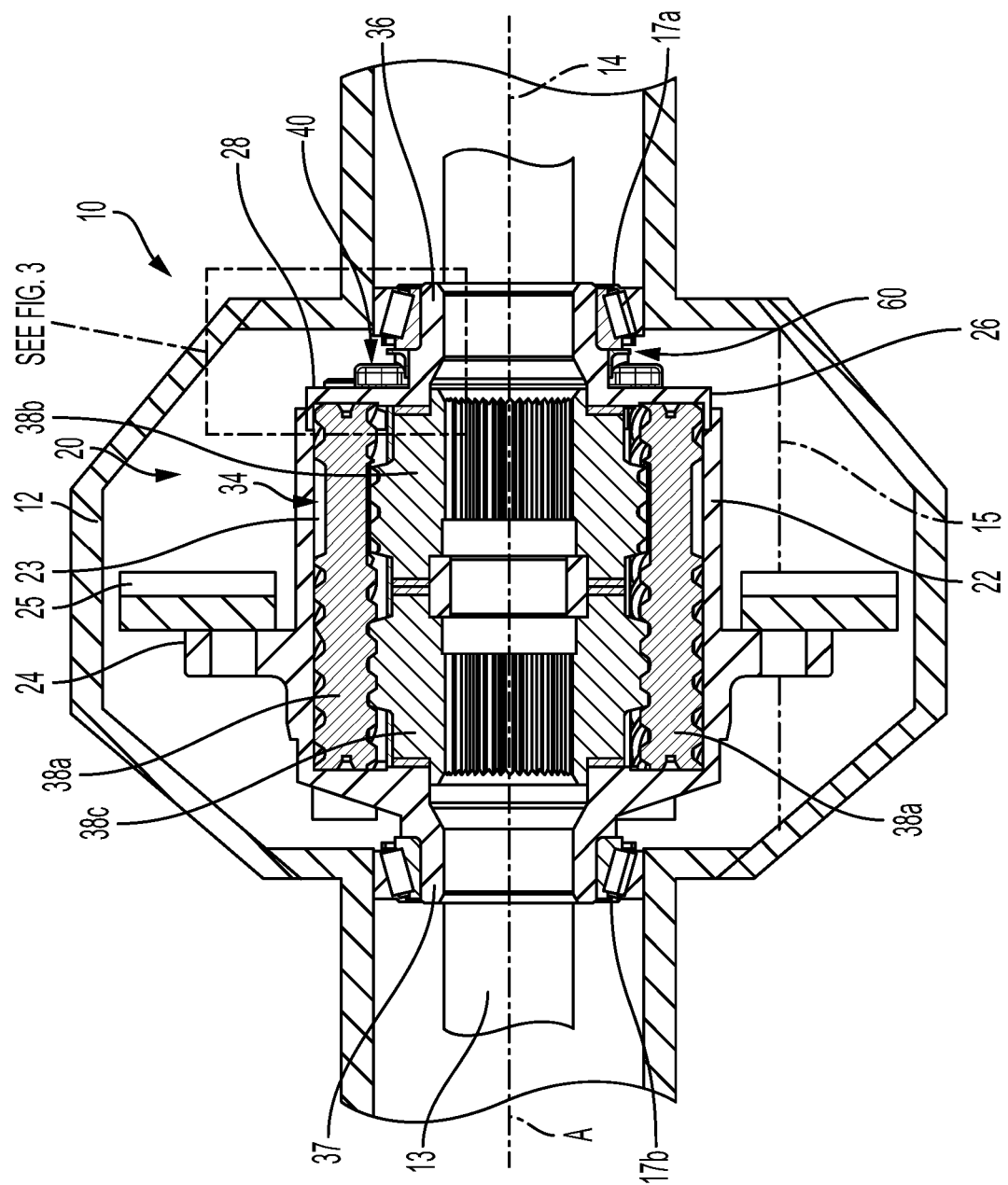
FIG. 2 is a cross-sectional view through the gear assembly shown in FIG. 1, illustrated as a differential within a differential casing.
Figure 3:
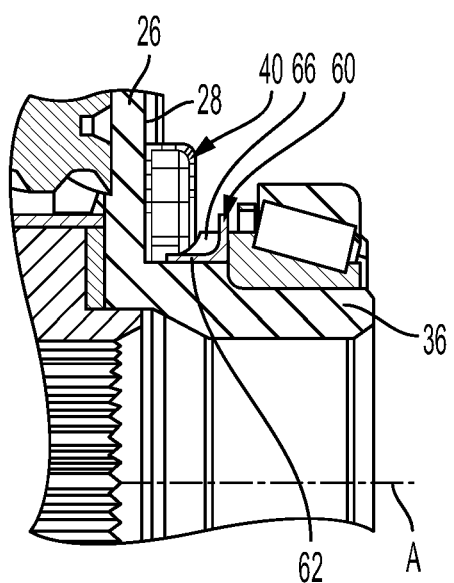
FIG. 3 is an enlarged detail taken from FIG. 2 showing the lubricant collection ring and lubricant deflector ring on the gear assembly of FIG. 1.
Figure 4:
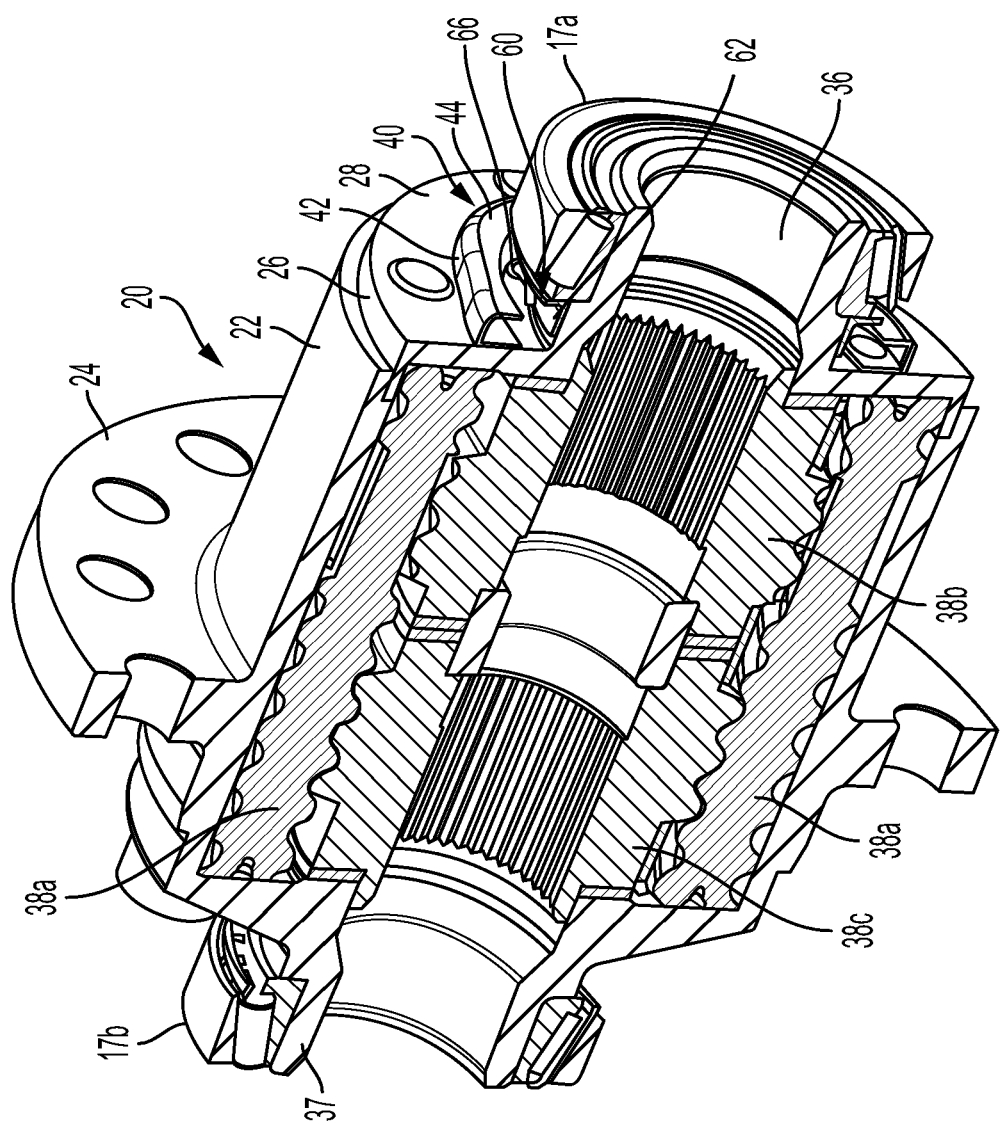
FIG. 4 is a perspective view, partially in cross section, of the gear assembly shown in FIG. 1.

Referring to FIGS. 1-4, a gear assembly 20 having an improved lubricant flow in accordance with an embodiment of the present disclosure is shown. The gear assembly 20 can be, for example, a differential 10, as shown in FIG. 2 that is part of an E-Axle assembly. The gear assembly 20 can be a helical differential that is located within a differential casing 12 with axles 13, 14 extending from each end of the gear assembly 20. As helical differentials are well known, a detailed description of their functioning is not required.

As shown in detail in FIG. 2, the gear assembly 20 includes a rotatable housing or cover 22 (generally referred to as a rotatable housing herein) having a drive flange 24 located thereon to which a ring gear 25 can be connected in order to drive the rotatable housing 22 about the axis A. A gear compartment 23 is located within the rotatable housing 22 in which a gear set 34 that can include gears 38a, 38b, 38c, is located. A cover plate 26 is removably attached to an end of the rotatable housing 22 and includes an axial end face 28. A sleeve-shaped support 36 can extend from the axial end face 28 on one side, while a separate sleeve-shape support 37 can extend from an opposite axial end of the rotatable housing 22 in order to provide bearing supports for bearings 17a, 17b that rotatably support the rotatable housing 22 in the casing 12. At least one lubrication in-flow opening 30, and preferably a plurality of lubrication in-flow openings 30 are located in the axial end face 28. Connector openings 32, as explained in further detail below, are also located in the axial end face 28 for connection of a lubricant collection ring 40.

As shown in detail in FIGS. 1-4, the lubricant collection ring 40 has an axially extending outer wall 44 connected to the end face 28. In one embodiment, the axially extending outer wall 44 is located radially outwardly from the at least one lubrication in-flow opening 30. However, other arrangements could be provided with lubricant floe passages extending through the outer wall 44 for connection to the lubricant in-flow openings 30, depending on the particular application. A radially inwardly extending side wall 44 extends from the axially extending outer wall 42 in a position spaced apart from the axial end face 28. The lubricant collection ring 40 can also include a side wall 46 that is adjacent to the axial end face 28 in the installed position. In the illustrated embodiment, lubricant flow guides 48 extend from this adjacent side wall 46, as shown in detail in FIG. 1, and into the lubricant in-flow openings 30. Additionally, connectors 50 may be formed on the adjacent side wall 46 for connection to the axial end face 28 of the rotatable housing 22. The lubricant collection ring 40 can be an integral one-piece molded part formed from a plastic material, preferably by injection molding.

Figure 5:
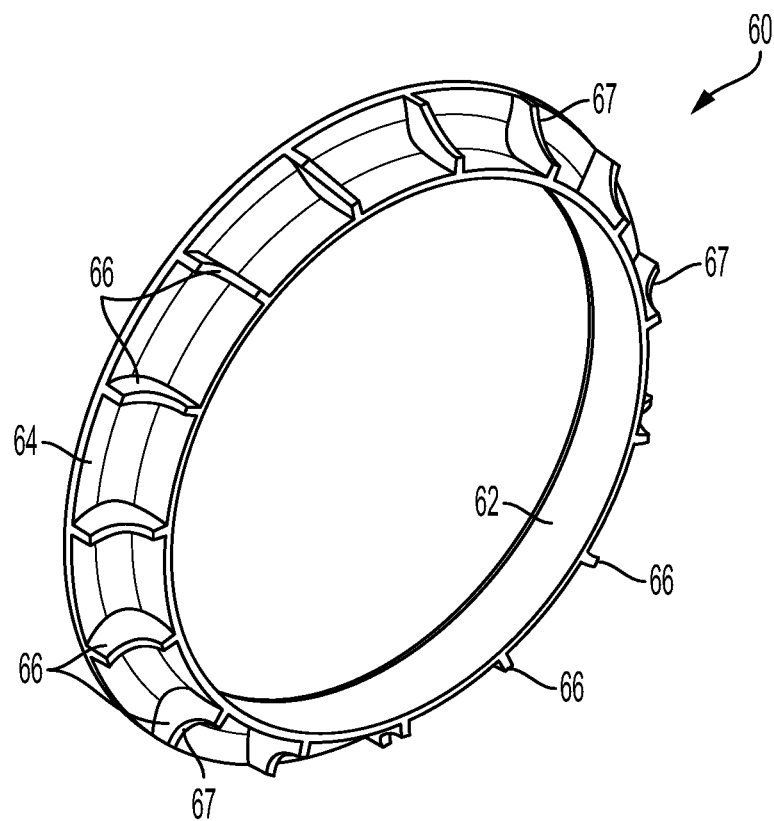
FIG. 5 is a perspective view of the lubricant deflector ring shown in FIGS. 1-4 constructed as an integrally molded one-piece component.
Figure 6:
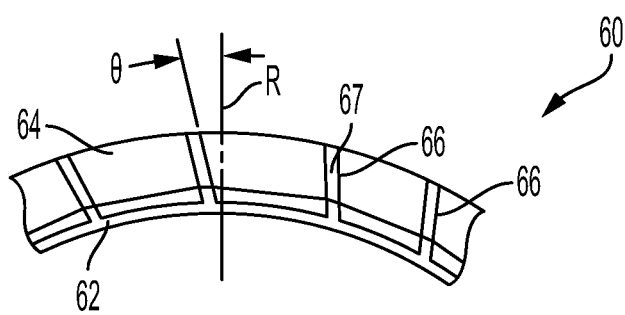
FIG. 6 is an enlarged end view of a portion of the lubricant deflector ring shown in FIG. 5 illustrating the vanes being arranged at an angle greater than 0 and less than 35° from a true radial direction.

Still with reference to FIGS. 1-4, a deflector ring 60 is connected to the rotatable housing 22 and located radially inwardly from the lubricant collection ring 40. The lubricant deflector ring 60 includes a plurality of radially outwardly vanes 66 that at least partially axially overlap with the lubricant collection ring 40. In the illustrated embodiment, the lubricant deflector ring 60 also includes an axially extending wall 62 as well as a radially outwardly extending end wall 64, and the radially outwardly directed vane 66 are connected to at least one of the axially extending wall 62 or the radially outwardly extending wall 64, and in the illustrated embodiment to both. The vanes 66 may include a concave-shaped free edge 67 at an area opposite to the connection to the axially ending wall 62 and the radially outwardly extending wall 64. The specific shape can vary depending on the application and the shape can assist in directing the direction that the lubricant is flung by the vanes 66 during rotation. In one embodiment, shown in FIG. 5, the lubricant deflector ring is integrally formed as a molded plastic part, and can be injection molded such that the vanes 66 as well as the axially extending wall 62 and/or the radially outwardly extending wall 64 are formed in one piece.

In order to improve lubricant flow, the vanes 66 may be arranged at an angle $\theta > 0°$ and less than 35°, and more specifically from 10° to 25° from a true radial direction R. In one arrangement, the vanes 66 are angled in a direction that the rotatable housing 22 is adapted to rotate during a majority of operating conditions. Specifically, in connection with the differential 10, this direction is a direction of forward rotation for the axles 13, 14 for movement of a vehicle in a forward direction.

In one embodiment, the lubricant deflector ring 60 is press-fit onto the sleeve-shape support 36 that extends from the axial end face 28 of the rotatable housing 22. However, it could be connected by a fastener, lock ring, or any other suitable manner.

In another aspect, a method of lubricating a differential 10 is provided. The method includes providing the gear assembly 20 in the differential casing 12 as described above, with the gear assembly 20 including the rotatable housing 22 with the axial end face 28 and the at least one lubrication in-flow opening 30 with a gear set, for example including the helical differential gears 38a-38c, located in the rotatable housing 22. The lubricant collection ring 40 has one or more of the features noted above and is connected to the axial end face 28. The lubricant deflector ring 60 having one or more of the features noted above is connected to the rotatable housing 22 and located radially inwardly from the lubricant collection ring 40. The lubricant deflector ring 60 includes the plurality of radially outwardly directed vanes 66 that at least partially axially overlap with the lubricant collection ring 40. The method further includes rotating the gear assembly 22 and splashing lubricant, indicated at 15 in FIG. 2, from a bottom of the casing 12 to the lubricant deflector ring 60. The vanes 66 of the lubricant deflector ring 60 collect and accelerate the splashed lubricant 15 radially outwardly (by applying a centripetal force due to the rotation of the vanes 66), and at least some of the lubricant 15 is captured with the axially extending outer wall 42 and the radially inwardly extending side wall 44 in order to guide the lubricant 15 to the at least one lubrication in-flow opening 30 and into the rotatable housing 22 to lubricate the gear set 34 located therein.

The lubricant deflector ring 60 may include one or more of the features as discussed above.

The method can further include arranging the vanes 66 on the lubricant deflector ring 60 at an angle θ greater than 0° and less than 35° from a true radial direction. This enhances the lubricant collection and guidance of the lubricant that is directed toward the lubricant collection ring 40.

Using the present arrangement with the lubricant defector ring 60, an enhanced lubricant flow to the gear set 34 located within the gear assembly 20 is provided.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 differential
12 differential casing
13 axle
14 axle
15 lubricant
17a, b bearings
20 gear assembly
22 rotatable housing
24 drive flange
25 ring gear
26 cover plate
28 axial end face
30 lubrication in-flow openings
32 connector openings
34 gear set
36 sleeve-shaped support
37 sleeve-shaped support
38a, b, c gears
40 lubricant collection ring
42 axially extending outer wall
44 an axially extending outer wall
46 side wall
48 lubricant flow guides
50 connectors
60 lubricant deflector ring
62 axially extending wall
64 the radially outwardly extending wall
66 vanes
67 concave-shaped free edge
A axis
θ angle of vanes from true radial direction

The invention claimed is:

1. A gear assembly, comprising
a rotatable housing having an axial end face with at least one lubrication in-flow opening;
a gear set located in the rotatable housing;
a lubricant collection ring having an axially extending outer wall connected to the axial end face and a radially inwardly extending sidewall that extends from the axially extending outer wall in a position spaced apart from the axial end face; and
a lubricant deflector ring connected to the rotatable housing and located radially inwardly from the lubricant collection ring, the lubricant deflector ring including a plurality of radially outwardly directed vanes that at least partially axially overlap with the lubricant collection ring.

2. The gear assembly of claim 1, wherein the lubricant deflector ring includes an axially extending wall and a radially outwardly extending end wall, and the radially outwardly directed vanes are connected to the axially extending wall and the radially outwardly extending wall.

3. The gear assembly of claim 2, wherein the vanes include a concave-shaped free edge at an area opposite to a connection to the axially extending wall and the radially outwardly extending wall.

4. The gear assembly of claim 1, wherein the vanes are arranged at an angle greater than 0° and less than 35° from a true radial direction.

5. The gear assembly of claim 4, wherein the vanes are angled in a direction that the rotatable housing is adapted to rotate during a majority of operating conditions.

6. The gear assembly of claim 1, wherein a sleeve-shaped support extends from the axial end face, and the lubricant deflector ring is press-fit on the sleeve-shaped support.

7. The gear assembly of claim 1, wherein the axially extending outer wall is located radially outwardly from the at least one lubrication in-flow opening.

8. The gear assembly of claim 1, wherein the gear assembly is a helical differential.

9. The gear assembly of claim 8, wherein the rotatable housing includes a drive flange, and a gear compartment in which gears are located, and the axial end face is located on a removable cover plate that is attached to an end of the rotatable housing.

10. A method of lubricating a differential, the method comprising:
providing a gear assembly in a differential casing, the gear assembly including a rotatable housing having an axial end face with at least one lubrication in-flow opening, a gear set located in the rotatable housing, a lubricant collection ring having an axially extending outer wall connected to the axial end face and a radially inwardly extending sidewall that extends from the axially extending outer wall in a position spaced apart from the axial end face, and a lubricant deflector ring connected to the rotatable housing and located radially inwardly from the lubricant collection ring, the lubricant deflector ring including a plurality of radially outwardly directed vanes that at least partially axially overlap with the lubricant collection ring;

rotating the gear assembly and splashing lubricant from a bottom of the casing to the lubricant deflector ring;

the vanes of the lubricant deflector ring accelerating the lubricant radially outwardly; and capturing at least some of the lubricant with the axially extending outer wall and the radially inwardly extending sidewall, and guiding the lubricant to the at least one lubrication in-flow opening and into the rotatable housing to lubricate the gear set therein.

11. The method of claim 10, wherein the lubricant deflector ring includes an axially extending wall and a radially outwardly extending end wall, and the radially outwardly directed vanes are connected to the axially extending wall and the radially outwardly extending wall.

12. The method of claim 11, wherein the vanes include a concave-shaped free edge at an area opposite to a connection to the axially extending wall and the radially outwardly extending wall.

13. The method of claim 10, further comprising arranging the vanes at an angle greater than 0° and less than 35° from a true radial direction.

14. The method of claim 13, wherein the vanes are angled in a direction that the rotatable housing is adapted to rotate during a majority of operating conditions.

15. The method of claim 10, wherein a sleeve-shaped support extends from the axial end face, and the method further comprises press-fitting the lubricant deflector ring on the sleeve-shaped support.

16. The method of claim 10, wherein the axially extending outer wall is located radially outwardly from the at least one lubrication in-flow opening.

17. The method of claim 10, wherein the gear assembly is a helical differential.

18. The method of claim 17, wherein the rotatable housing includes a drive flange, and a gear compartment in which gears are located, and the axial end face is located on a removable cover plate that is attached to an end of the rotatable housing.

* * * * *